United States Patent
Blajwajs et al.

(10) Patent No.: US 10,636,239 B2
(45) Date of Patent: Apr. 28, 2020

(54) HANDHELD DEVICE AND A METHOD FOR VALIDATING AUTHENTICITY OF BANKNOTES

(71) Applicant: BSECURE LTD., Caesarea (IL)

(72) Inventors: Zeev Blajwajs, Tel Aviv (IL); Allen Judis, Hadera (IL); Aryeh Levin, Beer Sheva (IL)

(73) Assignee: BSECURE LTD., Caesarea (IL)

( * ) Notice: Subject to any disclaimer, the term of this patent is extended or adjusted under 35 U.S.C. 154(b) by 96 days.

(21) Appl. No.: 15/746,143

(22) PCT Filed: Jul. 12, 2016

(86) PCT No.: PCT/IL2016/050746
§ 371 (c)(1),
(2) Date: Jan. 19, 2018

(87) PCT Pub. No.: WO2017/013642
PCT Pub. Date: Jan. 26, 2017

(65) Prior Publication Data
US 2018/0218554 A1    Aug. 2, 2018

(30) Foreign Application Priority Data
Jul. 20, 2015 (IL) .......................... 240023

(51) Int. Cl.
| | | |
|---|---|---|
| *G07D 7/1205* | (2016.01) | |
| *G01N 21/55* | (2014.01) | |
| *B42D 25/29* | (2014.01) | |
| *B42D 25/378* | (2014.01) | |

(52) U.S. Cl.
CPC .......... *G07D 7/1205* (2017.05); *G01N 21/55* (2013.01); *B42D 25/29* (2014.10); *B42D 25/378* (2014.10); *G07D 2207/00* (2013.01)

(58) Field of Classification Search
CPC .... G07D 7/1205; G07D 2207/00; G07D 7/12; G07D 7/121; G07D 7/128; G01N 21/55; B42D 25/29; B42D 25/378
See application file for complete search history.

(56) References Cited

U.S. PATENT DOCUMENTS

| | | | |
|---|---|---|---|
| 6,241,069 B1 * | 6/2001 | Mazur | G06Q 20/18 194/207 |
| 2004/0129893 A1 | 7/2004 | Usami et al. | |
| 2005/0213078 A1 | 9/2005 | Grob et al. | |
| 2005/0257270 A1 | 11/2005 | Grassi et al. | |

(Continued)

FOREIGN PATENT DOCUMENTS

| | | |
|---|---|---|
| DE | 102 46 563 A1 | 4/2004 |
| DE | 10 2009 017 668 A1 | 10/2010 |
| EP | 2 549 445 A1 | 1/2013 |

(Continued)

*Primary Examiner* — Hina F Ayub
*Assistant Examiner* — Amanda Merlino
(74) *Attorney, Agent, or Firm* — Vorys, Sater, Seymour and Pease LLP (57) ABSTRACT

Provided is a handheld device for validation authenticity of a banknote including one or more printed elements printed with at least one security ink, the security ink having defined light reflecting properties. Further provided is a method for validating the authenticity of a banknote utilizing the disclosed device.

13 Claims, 6 Drawing Sheets

(56) References Cited

U.S. PATENT DOCUMENTS

2010/0012728 A1  1/2010  Rosset et al.
2012/0119075 A1  5/2012  Gerigk et al.

FOREIGN PATENT DOCUMENTS

FR   2 868 582 A3   10/2005
WO   2005/076742 A2   8/2005
WO   2014/072707 A1   5/2014

* cited by examiner

HANDHELD DEVICE AND A METHOD FOR VALIDATING AUTHENTICITY OF BANKNOTES

TECHNOLOGICAL FIELD

The present invention relates to a handheld device and a method for validating the authenticity of banknotes.

BACKGROUND

The authenticity of banknotes is protected by a variety of security features which may include security paper, security inks and the inclusion of security threads and foils.

Handheld devices and desktop machines for determining the validity of an authentic banknote are available.

WO 2005/076742 describes an apparatus and method for discriminating between authentic and forged banknotes. A handheld optical device is provided which illuminates indicia printed with security ink and measures the spectral absorption thereof at a plurality of discrete wavelengths. The device then compares these results with results to be expected from the scanning of the same defined feature of an authentic banknote. A display or other means informs the user whether or not the discrepancy between results and pre-stored values is within naturally occurring variations.

GENERAL DESCRIPTION

The present invention relates to a handheld device for determining authenticity of a banknote which comprises one or more printed elements comprising at least one security ink. The device has a window described below.

The security printing ink protects against counterfeiting and has spectral features such as absorption features which affect the properties of the light reflected therefrom upon illumination thereof with electromagnetic radiation.

The device according to the invention is configured to detect the light properties of the printed element and determine based thereon the validity of the authenticity of the banknote i.e., if spectral properties which are characteristic of a security ink of a genuine banknote are detected, then an output regarding the validity of the banknote authenticity is provided. The output is typically one that indicates a positive outcome, namely detection of a genuine banknote.

The device has an illumination source that radiates light out of said window. The term "light" denotes infrared (IR), visible (VIS), ultraviolet (UV), or any combination of the same, typically IR. The light illuminates the surface in front of it and if it illuminates said printed element, a characteristic reflected wavelength spectrum will then be detected by light detector/s within the device (configured to detect light incoming through said window) and a signal indicating authenticity will be issued. This signal may be one or both of a visual or audio signal. For this purpose, the reflected light, incoming through said window, is compared to a predetermined reference spectral property of a printed element of an authentic banknote and if the detected one correlates with the latter, the inspected element is characterized as indicating an authentic banknote.

The illuminating electromagnetic radiation and the light reflected back pass through an optical window in the device. The window may be shaped to correspond with the shape of the inspected element which is printed on the banknote and comprises the security ink or may be shaped to correspond to at least a portion of the element which comprises the security ink. Such a configuration of the window of the device according to the present invention enables illumination of mainly the element with the printed security ink. It further enables passage of the light through the window with minimal scattering and with optimal signal intensity of the reflected light and a better signal to noise.

It is appreciated that the device according to the invention may be used to validate the authenticity of various types of banknotes from different countries e.g., US Dollar and Brazilian Real and to validate the authenticity of more than one currency denomination. To this end, the device is typically configured to detect light of different spectra characteristic of security inks of various banknotes. The security ink may be comprised in a printed element on the banknote, the printed element being the same element in more than one banknote denominations (e.g., various denominations of US Dollar, such as 10 Dollars and above and/or various denominations of Brazilian Real, such as 10 Real and above), or may be different e.g., Brazilian Real vs. US Dollar.

Thus, according to one of its aspects the present invention provides a handheld device for validation authenticity of a banknote comprising one or more printed elements printed with at least one security ink, the security ink having defined light reflecting properties, the device comprises:

a housing having an activation switch and an optical window that permits light passage therethrough, the window having a shape corresponding to at least one of the elements or corresponding to at least a security ink-comprising portion of the at least one element; and an electronic assembly that can be activated by the switch housed with the housing and comprises:

an illumination source configured to emit light with a wavelength spectrum such that when impinging on a surface on the banknote printed with the security ink it will result in reflection of light of an identifiable spectrum;

a light detecting utility configured to receive light entering into the body (housing) of the device through the window and detect light of the identifiable spectrum; and a signaling utility that is activated upon detection of light of the identifiable spectrum, the activation of the signaling utility being indicative of an authentic banknote.

According to another one of its aspects the present invention provides a handheld device for validation authenticity of a US Dollar banknote, the banknote comprises a printed element printed with at least one security ink, the security ink having defined light reflecting properties, wherein the printed element is selected from the black United States Federal Reserve System seal, the green Department of the Treasury seal or both, the device comprises:

a housing having an activation switch and an optical window that permits light passage therethrough, the window having a shape corresponding to at least one of the elements (e.g., a circular shape) or corresponding to at least a security ink-comprising portion of the at least one element (e.g., an annular shape); and an electronic assembly that can be activated by the switch housed with the housing and comprises:

an illumination source configured to emit light with a wavelength spectrum such that when impinging on a surface on said US Dollar banknote printed with the security ink it will result in reflection of light of an identifiable spectrum;

a light detecting utility configured to receive light entering into the body (housing) of the device through the window and detect light of the identifiable spectrum; and a signaling utility that is activated upon detection of light of the identifiable spectrum, the activation of the signaling utility being indicative of an authentic US Dollar banknote.

According to a further one of its aspects the present invention provides a handheld device for validation authenticity of a Brazilian Real banknote comprising one or more printed elements printed with at least one security ink (e.g., said printed element is as identified herein in FIG. 3), the security ink having defined light reflecting properties, the device comprises:

a housing having an activation switch and an optical window that permits light passage therethrough, the window having a shape corresponding to at least a security ink-comprising portion of the at least one element (e.g., a circular shape, an annular shape, a square shape, an elliptical shape etc.); and an electronic assembly that can be activated by the switch housed with the housing and comprises:

an illumination source configured to emit light with a wavelength spectrum such that when impinging on a surface on the Brazilian Real banknote printed with the security ink it will result in reflection of light of an identifiable spectrum;

a light detecting utility configured to receive light entering into the body (housing) of the device through the window and detect light of the identifiable spectrum; and a signaling utility that is activated upon detection of light of the identifiable spectrum, the activation of the signaling utility being indicative of an authentic Brazilian Real banknote.

In a further one of its aspects the present invention provides a method for validating the authenticity of a banknote comprising one or more printed elements printed with at least one security ink, the security ink having defined light reflecting properties, the method comprises:

providing the device according to the invention;
activating the device;
placing the window of the device over said one or more printed elements;
monitoring a signal (signal indicator) outputted by the signaling utility and determining based thereon if the banknote is authentic.

Yet, in another one of its aspects the present invention provides a method for validating the authenticity of a banknote comprising one or more printed elements printed with at least one security ink, the security ink having defined light reflecting properties, the method comprises:

providing the device according to the invention;
activating the device;
placing the window of the device over said one or more printed elements having a shape corresponding to that of the window;
monitoring a signal (signal indicator) outputted by the signaling utility and determining based thereon if the banknote is authentic.

In yet another one of its aspects the present invention provides a method for validating the authenticity of a US Dollar banknote comprising one or more printed elements printed with at least one security ink, the security ink having defined light reflecting properties, the method comprises:

providing the device according to the invention;

activating the device;
placing the window of the device over said one or more printed elements having a shape corresponding to that of the window (e.g., circular or annular);
monitoring a signal (signal indicator) outputted by the signaling utility and determining based thereon if the US Dollar banknote is authentic.

Yet, in another one of its aspects the present invention provides a method for validating the authenticity of a Brazilian Real banknote comprising one or more printed elements printed with at least one security ink, the security ink having defined light reflecting properties, the method comprises:

providing the device according to the invention;
activating the device;
placing the window of the device over said one or more of said printed elements;
monitoring a signal (signal indicator) outputted by the signaling utility and determining based thereon if the Brazilian Real banknote is authentic.

In yet a further one of its aspects the present invention provides a kit comprising the device according to the invention and instructions for use.

Yet, in a further one of its aspects the present invention provides a device and a method as herein described and exemplified.

It is noted that the device according to the invention is user friendly (can be easily operated and used), the production thereof involves relatively low costs and it provides high accuracy in determining the validity of the authenticity of the inspected banknotes.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

According to one of its aspects the present invention provides a handheld device for validation authenticity of a banknote comprising one or more printed elements printed with at least one security ink, the ink having defined light reflecting properties, the device comprises:

a housing having an activation switch and an optical window that permits light passage therethrough, the window having a shape corresponding to at least one of the elements or corresponding to at least a security ink-comprising portion of the at least one element; and an electronic assembly that can be activated by the switch housed with the housing and comprises:

an illumination source configured to emit light with a wavelength spectrum such that when impinging on a surface on the banknote printed with the security ink it will result in reflection of light of an identifiable spectrum;

a light detecting utility configured to receive light entering into the body (housing) of the device through the window and detect light of the identifiable spectrum; and a signaling utility that is activated upon detection of light of the identifiable spectrum, the activation of the signaling utility being indicative of an authentic banknote.

As used herein, the term "handheld" device refers to a device that is used while being held by the user. The device is manually activated by the user upon operating the activation switch.

In a particular embodiment, the device according to the invention is a portable handheld device. To this end, the device further comprises a battery as a power source.

As used herein, the term "activation switch" refers to a manual switch. The activation of the device may be for example by pressing on the activation switch (said switch being adapted to be pressed e.g., being a push button or a push handle) or by sliding the activation switch (said switch being adapted to be slid e.g., being a handle configured to be slid to a certain position).

In some embodiments, when the manual activation switch is activated, a light indicator with a specific color that may be any of the visual spectral range (e.g., red LED indicator) is lit. Once the authenticity of the banknote is verified, the signaling utility is configured to change the color of the light indicator (e.g., the light indicator color may be changed from red to green) optionally accompanied by an audio output indicating that the banknote is genuine.

The housing (body) of the device may typically be designed to have aesthetic features. It may also be typically designed to be comfortably held by the palm of the user. The body may be made of any suitable material including but not limited to plastic, metal, alloy, polymeric materials, composite materials, combinations of any of the aforementioned and others.

The device according to the invention is configured to detect specific elements on the banknotes. As used herein the term "element" refers to a printed indicia on the banknote that comprises at least one security ink at least at a portion thereof. It is noted that apart from the security ink which at times may not be visually inspected, the element may further comprise one or more inks which are visible (e.g., black ink, green ink) so that the inspected element can be easily identified by the user. At times the security ink itself may have visible features. The printed element may be of any shape or figure. It may have a continuous or non-continuous pattern. Non limiting examples of such patterns are a line, a dot, number/s pattern, letter/s pattern etc.

In a particular embodiment, the element is one or both of the black United States Federal Reserve System seal and the green Department of the Treasury seal.

Figure 3:
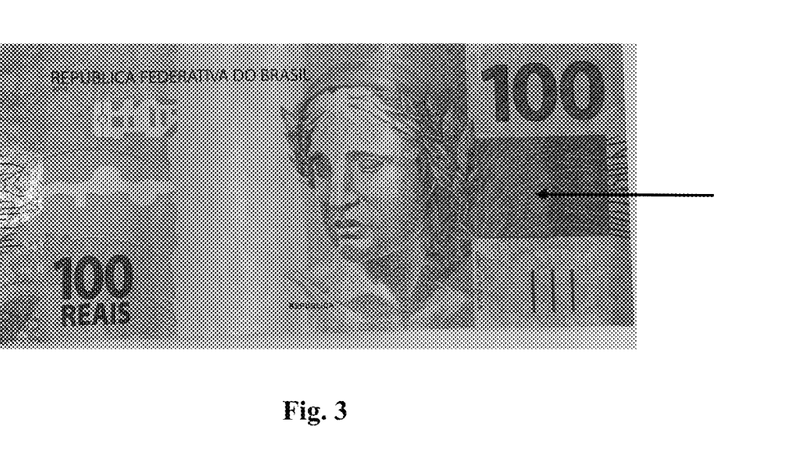
FIG. 3 shows the 100 Brazilian Real bill with an element which comprises a security ink, in accordance with an embodiment of the invention.

In a further particular embodiment the element is an element of Brazilian Real as herein illustrated in FIG. 3.

The device according to the present invention may be configured to determine validity of the authenticity of banknotes of various kinds (countries, denominations etc.).

To this end, the device may comprise a plurality of light emitting sources and one or more light detectors/sensors configured to emit and detect, respectively, light of various spectral characteristics.

The device according to the present invention may be used to validate the authenticity of more than one currency denomination. For example, 5, 10, 20, 50 and 100 US Dollar.

In a particular embodiment the device may be used to validate the authenticity of one or more of 10, 20, 50 and 100 US Dollar.

The device according to the present invention may also be used to validate the authenticity of one or more of 2, 5, 10, 20, 50 and 100 Brazilian Real.

In a particular embodiment the device may be used to validate the authenticity of one or more of 10, 20, 50 and 100 Brazilian Real.

In some embodiments the printed element may be the same element for more than one currency of a certain country e.g., banknotes of 10 or more US Dollars.

In some embodiments the printed element may be unique for each banknote denomination. To this end, the device of the invention is configured to identify each specific elements based on the unique spectral characteristics thereof.

In some embodiments, the banknote is a US Dollar bill wherein the printed element is one or both of the black United States Federal Reserve System seal and the green Department of the Treasury seal.

In some embodiments, the banknote is a Brazilian Real bill wherein the printed element is the element illustrated herein in FIG. 3.

In a particular embodiment the device may be used to validate the authenticity of one or more of 10, 20, 50, 100 US Dollar and/or one or more of 10, 20, 50 and 100 Brazilian Real.

As used herein the term "window" is an optical window which is transparent to light i.e., it permits passage of light therethrough.

The window of the device may have a shape which corresponds to the shape of the inspected element which is printed on the banknote and comprises the security ink or may have a shape which corresponds to at least a portion of the element; the portion comprises the printed security ink. In some embodiments the portion may be well observable in the banknote (e.g., an annular portion as detailed herein below in connection with US Dollar banknote). At times the portion may not have defined dimensions or features (e.g., as illustrated in FIG. 3 in connection with Brazilian Real banknote), to this end the window covers part of the element which is sufficient for the detection of the light returned from the element.

In some embodiments the window of the device of the invention has a circular shape. Such a shape corresponds for example to the global circular shape of the black United States Federal Reserve System seal or the global circular shape of the green Department of the Treasury seal. To this end, the diameter of the window is substantially identical to the diameter of said seals.

In some embodiments the window of the device of the invention has an annular shape. Such a shape corresponds for example to the annular region in the black United States Federal Reserve System seal or the annular region in the green Department of the Treasury seal. To this end, the dimensions of the annular window are substantially identical to the dimensions of the ring portion/area of said seals.

In some embodiments the window is substantially flat.

The window may be made of any material that is transparent to the emitted and reflected light radiation. Non limiting examples of such materials are glass, quartz or fused silica, sapphire, infrared transmitting materials such as germanium and KBr, transparent plastic materials, etc.

In some embodiments the banknote is a US banknote and the window is made of glass or of transparent plastic materials.

In some embodiments the window is made of glass, quartz or fused silica, sapphire or transparent plastic materials.

The window of the device according to the invention is located at the housing of the device such that it permits the user holding the device to bring it (the window) into proximity or into physical contact with the element printed on the banknote. The proximity (distance) may be up to few millimeters, sufficient to enable the device to illuminate the element and detect the light reflected from the surface of the illuminated banknote.

In some specific embodiments the banknote is a US Dollar bill wherein the printed element is one or both of the black United States Federal Reserve System seal and the green Department of the Treasury seal and wherein the window of the device is circular, corresponding to the circular shape of one of said seals.

In some specific embodiments the banknote is a US Dollar bill wherein the printed element is one or both of the black United States Federal Reserve System seal and the green Department of the Treasury seal and wherein the window of the device is annular, corresponding to the ring portion in one or more of the aforementioned seals. To this end, the window may be a transparent circular window with the center of the window being an opaque area (e.g., the center having been covered or painted with an opaque material) so that light from the illuminating source primarily illuminates the black or green circumference of the respective seals.

The security ink is printed on the banknote and is comprised within a printed element, the element being easily identified by the user.

In some embodiments, the banknote is a US Dollar banknote and the security ink is comprised within the black United States Federal Reserve System seal or within the green Department of the Treasury seal.

In some embodiments, the banknote is a US Dollar banknote and the security ink is comprised within both the black United States Federal Reserve System seal and the green Department of the Treasury seal.

The security ink comprised within the printed element on the banknote reflects a certain characteristic electromagnetic radiation upon illumination thereof which is detected by the light detecting utility of the device. This returned radiation is a unique spectral property of the security ink of an authentic banknote and is referred to herein as an "identifiable spectrum". Through comparison of the detected returned (reflected) electromagnetic radiation to that characteristic radiation, the validity of the authenticity of the banknote is determined i.e., if the detected reflected light has spectral characteristics which are identical (within a predetermined deviation value) to those identified by the device as characterizing an authentic banknote, the device will output a signal indication that the banknote is genuine. The characteristic return electromagnetic radiation may be characterized by one or more properties such as wavelength, wavelength spectrum, bandwidth, polarization, reflection intensity, absorption intensity, relative absorbance intensities between various predetermined wavelengths and others.

The returned electromagnetic radiation may be in a narrow bandwidth, e.g. essentially monochromatic, or may be of a broader bandwidth.

The security ink may absorb electromagnetic radiation in the IR, visible, UV or a combination of the same spectral regions. This absorbance affects the characteristic electromagnetic radiation returned from the banknote upon illumination thereof. The device of the invention is configured to calculate such absorption.

In some embodiments the security ink absorbs light in the IR spectral region (a non-limiting example of such an ink is the security ink found in the U.S seals indicated herein above and below). To this end, the device is configured to detect light in the infrared spectral region between about 700 and about 1000 nm.

In some embodiments the security ink absorbs light in the ultraviolet region. To this end, the device is configured to detect light in the ultraviolet region between about 200 and about 400 nm.

In some embodiments the "identifuable spectrum" of the security ink includes parts of both the IR spectral region and the visible spectral region. To this end, the device is configured to detect light in the infrared spectral region of between about 700 and about 1000 nm and in the visible spectral region of between about 400 nm to about 700 nm.

It is noted that the device according to the invention is configured to emit light at one or more specific wavelengths and/or at one or more specific wavelength ranges and to detect the light reflected from the surface of the banknote in one or more specific wavelengths and/or at one or more specific wavelength ranges. To this end, the device comprises an illumination source.

The term "illumination source" as used herein refers to any illuminating electromagnetic source emitting radiation, e.g. in the form of one or more of infrared, visible and ultraviolet light of at least one defined wavelength and/or at least one defined wavelength range. The illumination source may include but is not limited to one or more incandescent lamp, laser, diode laser, light-emitting diode (LED) or other conventional source of electromagnetic radiation.

In some embodiments, the illuminating electromagnetic radiation source may emit radiation in at least one of the following spectral regions: IR, visible and ultraviolet.

In some embodiments, the illumination source may emit radiation in the IR region.

In some embodiments, the illumination source may emit radiation in the UV region.

In some embodiments, the illumination source may emit radiation in the VIS region.

In some embodiments, the illumination source may emit radiation in one or both of infrared and visible regions.

In some embodiments, the illumination source may emit radiation in one or both of infrared and ultraviolet regions.

In some embodiments, the illuminating electromagnetic radiation source may comprise a plurality of light sources each emitting monochromatic radiation or may comprise one or more light sources each emitting polychromatic radiation or any combination of a number of discrete monochromatic and/or polychromatic radiation spectra. To this end, the device may include one or more filters transmitting radiation of specific spectral properties.

In some embodiments the device according to the invention is configured to emit light and/or to detect light in multiple wavelengths and/or multiple wavelength ranges providing it with the advantage of determining the present of various security inks which may be used in different banknotes and in various denominations. To this end, the device may comprise one light emitting source and one detector/sensor configured to emit light and detect light, respectively, at multiple wavelength/s. Or the device may comprise multiple light emitting sources and one or more detectors configured to emit light and detect light, respectively, at one or more wavelength/s.

In some embodiments the illumination source comprises one light source emitting light in a broad spectrum e.g., one incandescent lamp.

In some embodiments the illumination source comprises two or more light sources e.g., LEDs.

In some embodiments the illumination source comprises at least 3 light sources e.g., 3 LEDs. It is noted that at least 3 LEDs may be required to differentiate between a relatively narrow absorption feature and a broadband absorber as illustrated herein below with reference to FIG. 6.

In some embodiments the illumination source comprises a plurality of light sources e.g., 3, 4, 5, 6, 7, 8, 9 or 10 LEDs.

In a particular embodiment the illumination source comprises 8 light sources e.g., 8 LEDs.

In a particular embodiment the illumination source comprises 6 light sources e.g., 6 LEDs emitting light at the following 6 wavelengths: about 505 nm, about 660 nm, about 775 nm, about 820 nm, about 870 nm and about 950 nm. The illumination source may comprise duplicate light sources e.g., LEDs emitting light at the same wavelengths e.g. at about 775 nm and at about 820 nm. Thus, in a particular embodiment the illumination source comprises 4 light sources e.g., LEDs emitting light at the following 4 wavelengths: about 505 nm, about 660 nm, about 870 nm and about 950 nm, and additional 4 light sources e.g., 4 LEDs out of which 2 LEDs emitting light at about 775 nm and 2 LEDs emitting light at about 820 nm. The presence of duplicate light sources e.g., LEDs is advantageous and provides improved accuracy of the device of the invention as detailed herein below.

In some embodiments, the illumination source emits IR light at wavelengths in the range of about 700 nm to about 1000 nm. Typically, at two or more wavelengths of about 775 nm, about 820 nm, about 870 nm and about 950 nm.

In some embodiments the light source emits UV light at a spectral range of about 200 nm to 400 nm.

In some embodiments the light source emits VIS light at a spectral range of about 400 nm to 700 nm. Typically at one or both wavelengths of about 505 nm and about 660 nm.

As used herein the term "about" indicates ±10% of the specified values.

In some embodiments the one or more light sources (e.g., illuminating LEDs) are activated in a defined on/off sequence.

In some embodiments the illumination source comprises a plurality of light sources (e.g., illuminating LEDs) that are operated in sequential or a concerted manner.

In some embodiments the device according to the invention comprises a microprocessor with electronic circuit which controls the one or more light sources, for example triggers the onset of radiation, e.g. upon activation of the device by the user, and the time of the irradiation pulse. In some embodiments the radiation is applied on the inspected banknote for a defined period of time e.g., about 30 to 60 seconds. In some embodiments the radiation may be continuous over the above mentioned period of time. In further embodiments the radiation may consists of a series of pulses which may range in length from 10 microseconds to 1 milliseconds (or more e.g., 2, 3, 4, 5, 6, 7, 8, 9 or 10 milliseconds) and repeated at defined intervals.

The term "light detecting utility" as used herein refers to one or more optical detector/reader adapted to receive the electromagnetic radiation reflected from the illuminated security ink. The light detecting utility may include but is not limited to photodiodes, photomultipliers, infrared detectors, UV detectors and VIS detectors, typically, IR detectors.

The light detecting utility according to the present invention comprises one or more detectors with appropriate electronics sensitive to detect radiation which includes one or more of IR. VIS and UV radiation. The one or more detectors may all be adapted to detect radiation at the same wavelength or each group of detectors being adapted to detect radiation in a different wavelength than the other. A detector to be used in embodiments of the invention may be adapted to detect radiation of a narrow bandwidth, e.g. monochromatic radiation, or may have detection ability over a broader spectrum. The wavelength specification may be achieved, for example, through the use of filters or may be an intrinsic property of the detector.

The light detecting utility of the device according to the invention further comprises a processing utility (a module, including one or more electronic components) for analyzing the electromagnetic radiation which is reflected from the security ink on the banknote and detected by the one or more detectors, e.g. by comparing this detected signal to predetermined characteristics of electromagnetic signal of an authentic banknote stored in its memory; for example the relative intensity of the radiation at one or more and even at times at 3 or more specific wavelengths.

The processing utility may be associated with an analogue to digital (A-to-D) circuit which receives the signals from the one or more detectors and digitizes them. Once characteristics of the recorded signal are determined and analyzed, e.g. through comparison to corresponding predetermined characteristics that characterize an authentic banknote, if comparison results with similar characteristics (within an acceptable predetermined variation, e.g., naturally occurring variation between authentic banknotes) the microprocessor of the device provides an output indicative of the authenticity of the inspected banknote which activates a signaling utility to emit an appropriate signal/output indicator to the user. If no signal is provided, measurements are repeated until the total predetermined time period of about 30 to about 60 seconds has expired, then the device is turned off.

In some embodiments the signal/output indicator is a visual display, for example one or both of YES (authentic), NO (authenticity not determined) written indication and a light signal such as a LED (e.g., green light LED being indicative of an authentic banknote and red light LED indicating that the validity of the authenticity of the banknote has not been determined). In some embodiments the signal/output indicator is an audio indicator such as a buzzer, a bell that may, for example, be designed to provide a YES/NO audio indication of authenticity. In some further embodiment the signal/output indicator is a combination of a visual display and audio indication.

In some embodiments the device according to the invention may be configured to provide an output regarding the validity of the authenticity of specific currency e.g., an audio signal stating the specific country currency or a color coded light signal or a light signal with a shape corresponding to the currency e.g., light showing in the shape of a US Dollar i.e., $. To this end, the device is configured to identify the characteristic returned electromagnetic radiation and determined therefrom which currency was inspected e.g., US banknote or Brazilian banknote.

The device according to the invention may further utilize fluorescence characteristic of a security ink, wherein said ink has characteristic fluorescence radiation in addition to its one or more IR, VIS or UV radiation characteristics. To this end, the device is adapted to activate the fluorescence of the security ink by illumination and to detect the resulted radiation emitted from the banknote.

In some embodiments, the electronic assembly of the device may be switched off automatically following a defined time period after activation (e.g., 30 to 60 seconds) or after a defined time period of inactivity (e.g., 30 to 60 seconds).

The device of the invention further comprises a power source e.g., a battery.

According to another one of its aspects the present invention provides a handheld device for validation authenticity of a US Dollar banknote, the banknote comprises a printed element printed with at least one security ink, the ink having defined light reflecting properties, wherein the printed element is selected from the black United States Federal Reserve System seal, the green Department of the Treasury seal or both, the device comprises:

a housing having an activation switch and an optical window that permits light passage therethrough, the window having a shape corresponding to at least one of the elements (e.g., a circular shape) or corresponding to at least a security ink-comprising portion of the at least one element (e.g., an annular shape); and an electronic assembly that can be activated by the switch housed with the housing and comprises:

an illumination source configured to emit light with a wavelength spectrum such that when impinging on a surface on said US Dollar banknote printed with the security ink it will result in reflection of light of an identifiable spectrum;

a light detecting utility configured to receive light entering into the body (housing) of the device through the window and detect light of the identifiable spectrum; and a signaling utility that is activated upon detection of light of the identifiable spectrum, the activation of the signaling utility being indicative of an authentic US Dollar banknote.

According to further one of its aspects the present invention provides a handheld device for validation authenticity of a Brazilian Real banknote comprising one or more printed elements printed with at least one security ink, said printed element is as identified herein in FIG. 3, the ink having defined light reflecting properties, the device comprises:

a housing having an activation switch and an optical window that permits light passage therethrough, the window having a shape corresponding to at least a security ink-comprising portion of the at least one element (e.g., a circular shape, an annular shape, a square shape, an elliptical shape etc.); and an electronic assembly that can be activated by the switch housed with the housing and comprises:

an illumination source configured to emit light with a wavelength spectrum such that when impinging on a surface on the Brazilian Real banknote printed with the security ink it will result in reflection of light of an identifiable spectrum;

a light detecting utility configured to receive light entering into the body (housing) of the device through the window and detect light of the identifiable spectrum; and a signaling utility that is activated upon detection of light of the identifiable spectrum, the activation of the signaling utility being indicative of an authentic Brazilian Real banknote.

Yet, in another one of its aspects the present invention provides a method for validating the authenticity of a banknote comprising one or more printed elements printed with at least one security ink, the ink having defined light reflecting properties, the method comprises:

providing the device according to the invention;
activating the device;
placing the window of the device over said one or more printed elements;
monitoring a signal (signal indicator) outputted by the signaling utility and determining based thereon if the banknote is authentic.

In yet a further one of its aspects the present invention provides a method for validating the authenticity of a banknote comprising one or more printed elements printed with at least one security ink, the ink having defined light reflecting properties, the method comprises:

providing the device according to the invention;
activating the device;
placing the window of the device over said one or more printed elements having a shape corresponding to that of the window;
monitoring a signal (signal indicator) outputted by the signaling utility and determining based thereon if the banknote is authentic.

Yet, in another one of its aspects the present invention provides a method for validating the authenticity of a US Dollar banknote comprising one or more printed elements printed with at least one security ink, the ink having defined light reflecting properties, the method comprises:

providing the device according to the invention;
activating the device;
placing the window of the device over said one or more printed elements having a shape corresponding to that of the window;
monitoring a signal (signal indicator) outputted by the signaling utility and determining based thereon if the US Dollar banknote is authentic.

Yet, in another one of its aspects the present invention provides a method for validating the authenticity of a Brazilian Real banknote comprising one or more printed elements printed with at least one security ink, the ink having defined light reflecting properties, the method comprises:

providing the device according to the invention;
activating the device;
placing the window of the device over said one or more of said printed elements;
monitoring a signal (signal indicator) outputted by the signaling utility and determining based thereon if the Brazilian Real banknote is authentic.

In yet a further one of its aspects the present invention provides a kit comprising the device according to the invention and instructions for use.

The instructions may be written instructions including for example how to activate the device, how to scan the banknote, which elements to scan and for how long (time) and how to conclude that the banknote is authentic e.g., by identifying the signal indicator. The instructions may include drawing illustration/s (e.g., one or more figures) of the operation guidelines and/or of the banknote/s and the element on the banknote/s to be scanned by the user.

Figure 1:
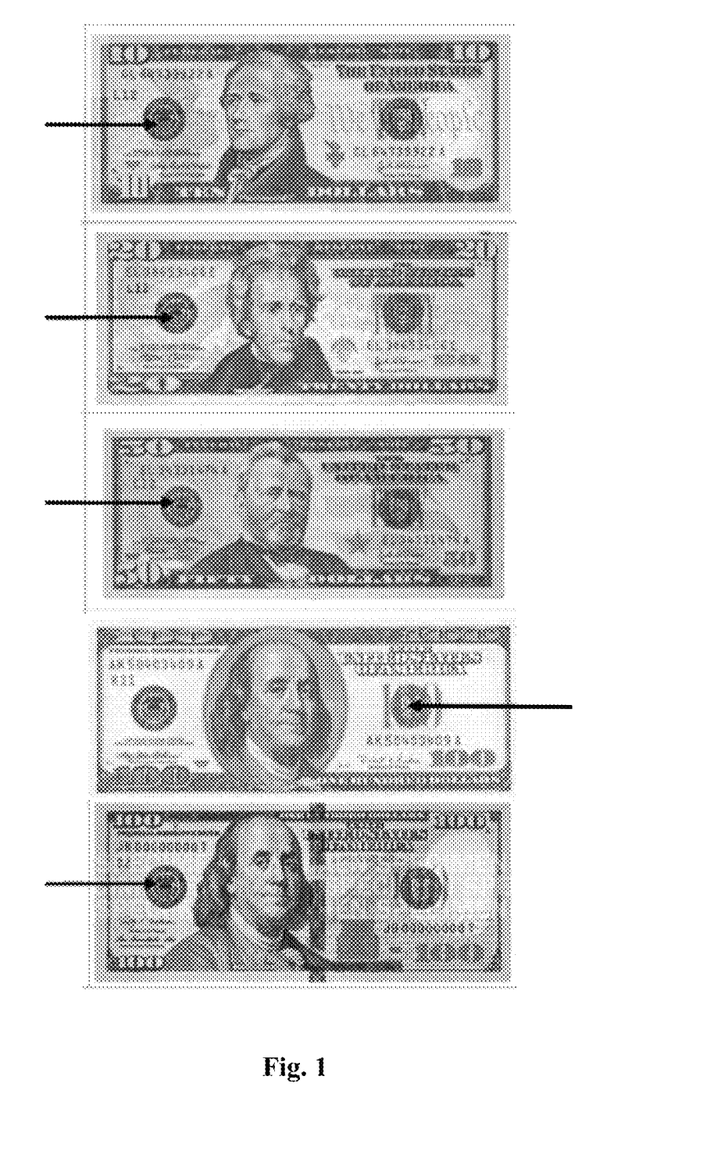
FIG. 1 shows various US Dollar bills with elements printed with a security ink in accordance with an embodiment of the invention.

Reference is now made to FIG. 1 in which 10, 20, 50 and 100 US Dollar bills are shown. The various bills are printed with the black United States Federal Reserve System seal element and the green Department of the Treasury seal element. The element on the bill which comprises a security ink is indicated in the figure by a black arrow. The black United States Federal Reserve System seal element which comprises a security ink is shown with a black arrow at the left hand side of the figure, and the green Department of the Treasury seal element which comprises a security ink is shown with the 100 US Dollar bill as indicated by the arrow at the right hand side of the figure. It is noted that in US Dollar bills a security ink may be comprised in either one or both seals. The bills in FIG. 1 comprise both of said elements, but with only one element comprising the security ink.

Figure 2A:
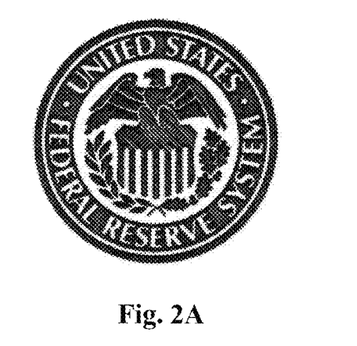
FIGS. 2A-2B show the black United States Federal Reserve System seal (FIG. 2A) and the green United States Department of the Treasury seal (FIG. 2B), either one or both elements may incorporate a printed security ink, in accordance with an embodiment of the invention.
Figure 2B:
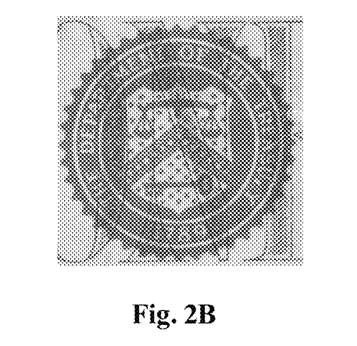

FIG. 2A shows the black United States Federal Reserve System seal and FIG. 2B shows the green United States Department of the Treasury seal. The circular characteristic shape of both seals is clearly shown in these figures. Further, the annular portion of these seals is also clearly shown in the figure; it includes the wordings "United States Federal Reserve System" and "United States Department of the Treasury" respectively, and it may comprise a security ink which is detected with a device having a window of an annular shape with the dimensions substantially similar to those of the ring in each of these seals.

FIG. 3 show a 100 Brazilian Real bill with an arrow indicating a printed element on the bill to be scanned by the user, the element comprises a printed security ink.

Figure 4:
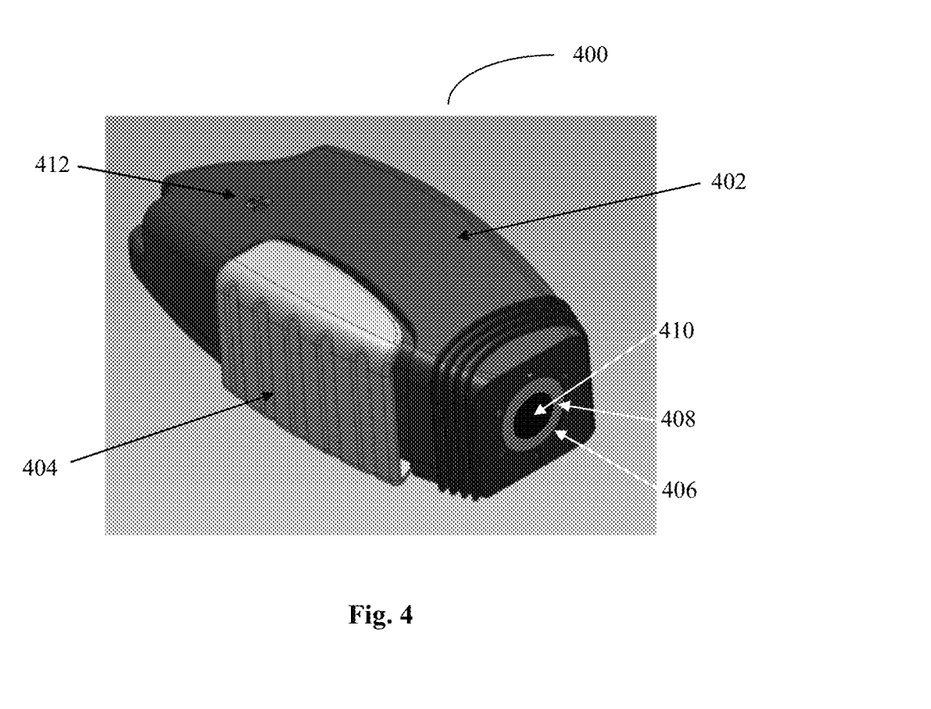
FIG. 4 shows a schematic illustration of a device in accordance with an embodiment of the invention.

FIG. 4 provides a schematic illustration of a device in accordance with an embodiment of the invention. The device (400) has a housing (402); an activation switch (404) manually operable by the user prior to testing the banknote authenticity so as to activate the device; an optical circular window (406) having an annular transparent region (408) and an opaque area at the center thereof (410); and a signaling light output (412) indicating authenticity once lit in a certain color e.g., green light (and in a particular non-limiting embodiment showing a $ shape). One or more emitting light sources and one or more light detecting sensors are assembled within the device (not shown). The assembly is designed to emit a light signal towards the window (406) and record the return signal.

Figure 5:
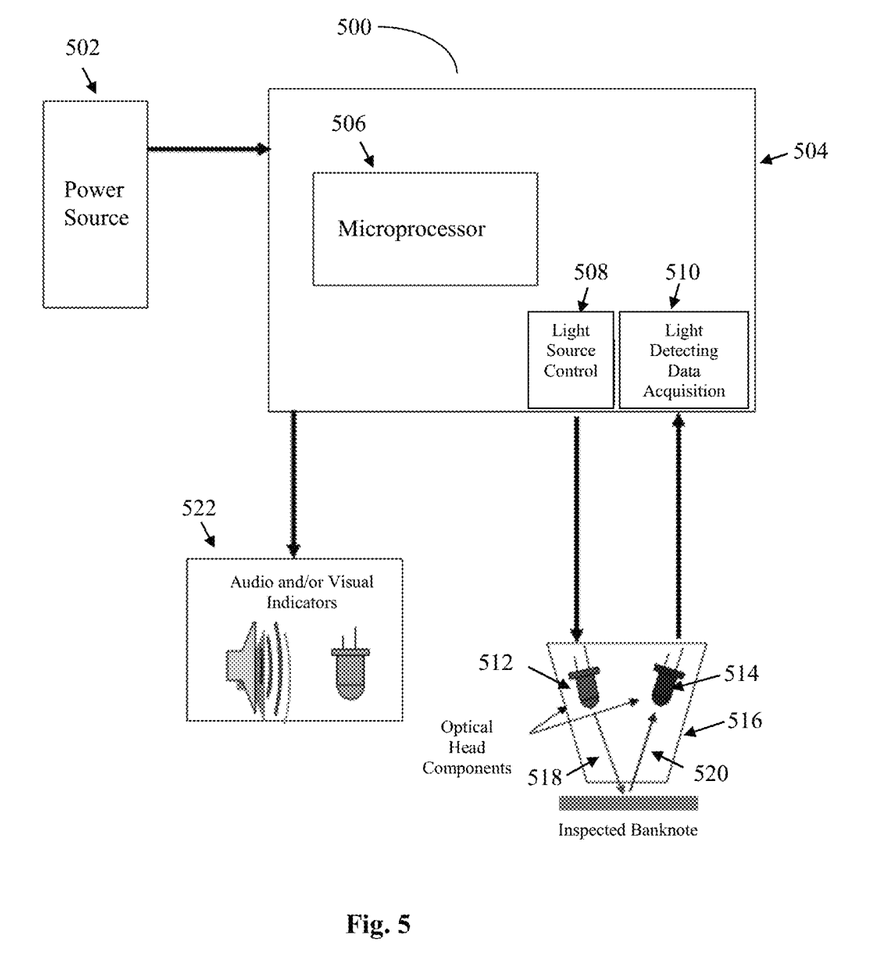
FIG. 5 shows a schematic illustration of the circuitry of a device in accordance with an embodiment of the invention.

FIG. 5 shows a schematic illustration of the circuitry (500) of a device in accordance with an embodiment of the invention. The circuitry includes a power source (502) e.g., a battery-powered; a control module (504), with a microprocessor (506) with a memory; a light emitter control unit (508) and a data acquisition light detecting unit (510) which are, respectively, linked to light emitter (512) and light sensor (514) configured within an optical head (516) of the device to emit and receive electromagnetic signals as represented schematically by arrows (518) and (520). The control module (504) is also linked to an output indicator unit (522) for emitting an audio, visual or audiovisual signal indicating authenticity or indicating that authenticity has not been determined.

Figure 6:
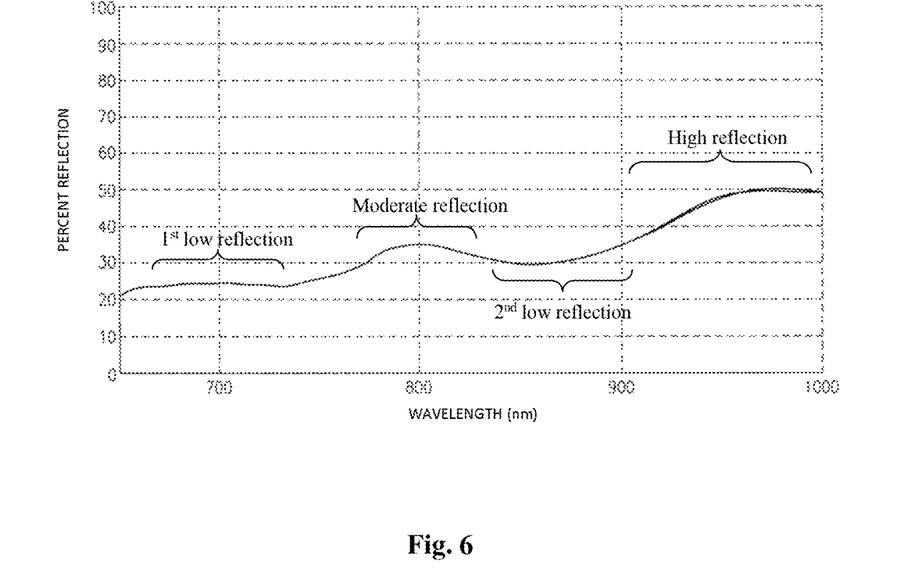
FIG. 6 is a graph showing the near-infrared spectrum of light reflected from the black United States Federal Reserve System seal, in accordance with an embodiment of the invention.

FIG. 6 displays a graph which presents the infrared spectrum of light reflected from the black US Federal Reserve System seal which comprises a security ink. The X axis represents the wavelength in nm and the Y axis represents the reflection percentage. As can be observed in the figure, the spectrum has a relatively narrow peak area as well as broad peak areas. Specifically, the spectrum is characterized by a first low reflection region, a moderate reflection region, a second low reflection region and a high reflection region (said regions are illustrated in FIG. 6). The device of the present invention is configured to record the reflected light at the peak of the moderate reflection region, the reflected light at the valley of the second low reflection region and to record the reflected light in the first low reflection region and reflected light in the high reflection region and to calculate therefrom the corresponding absorption in these specific regions. For validation of authenticity of US Dollar currencies, in a particular embodiment, the device of the present invention is configured to uniquely detect the reflected light (and to determine therefrom the corresponding absorbance) at about 775 nm, at about 820 nm, at about 870 nm and at one or more wavelengths below about 720 nm (e.g., about 660 nm and/or about 505 nm) and one or more wavelength above about 900 nm (e.g., about 950 nm). If the calculated absorbance is comparable (within a predetermined acceptable deviation value) to that of an authentic US Dollar banknote, the device will provide a signal indicating that the inspected banknote is genuine.

Accordingly, in a particular embodiment, checking the characteristic absorptions of a security ink of the US Federal Reserve System element of US Dollar currencies at about 775 nm, about 820 nm, about 870 nm, about 660 nm, about 505 nm and about 950 nm provides indication on the validity of the authenticity of the US Dollar.

The inventors of the present invention have also found that checking the characteristic absorptions of a security ink of the United States Department of the Treasury seal element of US Dollar currencies at about 775 nm, about 820 nm, about 870 nm, about 660 nm, about 505 nm and about 950 nm provides indication on the validity of the authenticity of the US Dollar.

Similarly, the inventors of the present invention have found that checking the characteristic absorptions of a security ink of the element depicted in FIG. 3 of Brazilian Real currencies at about 660 nm, about 820 nm and at about 950 nm provides indication on the validity of the authenticity of the Real. Accordingly, in a particular embodiments, the device of the present invention is configured to record the light reflected from a Brazilian Real banknote at about 660 nm, about 820 nm and at about 950 nm, calculate therefrom the corresponding absorbance in these specific wavelengths, compare the calculated value to that of an authentic Brazilian Real banknote and based on said comparison determine the authenticity of the inspected banknote.

It is noted that the device according to the invention may be configured to determine the authenticity validity based on the calculated absorption as detailed herein above as well as based on calculation of the relative absorptions between various predetermined wavelengths as detailed herein above. This operation may enhance accuracy in the authenticity validity determination as it adds a further variable to be compared to.

It is appreciated that the device according to the invention is applicable to determine the authenticity validity of both US Dollar currencies and Brazilian Real banknotes. To this end, the device is equipped with a plurality of light sources (e.g., LEDs), each configured to emit light at specific wavelength and one or more light detectors configured to detect the light reflected back from an element on the inspected banknote in said specific wavelengths.

In some embodiments the device comprises two or more light sources configured to sequentially emit light and one detector configured to detect the light reflected back from the inspected banknote in a sequential manner.

In some embodiments the device comprises two or more light sources configured to simultaneously emit light and corresponding two or more detectors each configured to detect the light reflected back from the inspected banknote each in a specific predetermined wavelength.

In some embodiments the device comprises one light source configured to emit light in a broad spectrum and two or more detectors each configured to detect the light reflected back from the inspected banknote each in a specific predetermined wavelength.

In a particular embodiment the device comprises a plurality of LEDs which sequentially emit light and one detector configured to detect the light reflected back from the inspected banknote in a sequential manner.

In some embodiments the illumination source of the device according to the invention comprises 6 LEDs which emit light in the following wavelengths (one LED for each specified wavelength): about 505 nm, about 660 nm, about 775 nm, about 820 nm, about 870 nm and about 950 nm. The device further comprises additional 2 LEDs which emit light in about 775 nm and about 820 nm (one LED for each specified wavelength) i.e., totally 8 LEDs each emit light at specified wavelength with duplicate LEDs at about 775 nm and about 820 nm. The inventors of the present invention have found that the duplicate LEDs at about 775 nm and about 820 nm (these wavelengths represents the edges of the moderate reflection region) improves the accuracy of the device according to the invention. Without wishing to be bound thereto, the duplicate LEDs enable overcoming problems associated with improper scanning by the user of the printed element on the banknote, for example by tilting the device at an angle which results with scanning in which the optical head of the device is not positioned perpendicular to the scanned security element. Such tilting results in an improper reading of the reflected light which is compensated by the duplicate reading. The duplicate LEDs may also overcome problems associated with scanning of banknotes in which the quality of the printed element is low, due for example of wear of the banknote which may result in insufficient amount of the security ink which may be reflected in the absorption properties thereof. It is noted in this respect that the presence of said duplicate LEDs is aimed to avoid false cases in which the validation of an authentic banknote is not determined due to poor quality of the banknote. It is further noted that at times, when the quality of the banknote is too low but it may be authentic, the device will not output a signal indicating that the banknote is genuine. As noted above, the output of the device according to the invention is typically one that indicates a positive outcome. In case wherein no output is provided by the device, one should not conclude that the inspected banknote is not authentic, due to the reasons detailed above. The device only aims to validate the authenticity of the inspected banknote. It does not provide an indication that the banknote is a counterfeit banknote.

It is noted that the inclusion of 8 LEDs (as detailed herein above) in the device according to the invention provides the best compromise between flexibility in wavelengths, compactness (the number of LEDs is limited by the dimensions of the handheld device and the dimensions of the optical head in which they are housed) and cost.

The invention claimed is:

1. A handheld device for validation authenticity of a US Dollar banknote, said banknote comprising one or more printed elements printed with at least one security ink, the security ink having defined light reflecting properties, the device comprising:

a housing having an activation switch and an optical window that permits light passage therethrough, said window having an annular shape corresponding to at least one of said elements; and     an electronic assembly that can be activated by said switch housed with said housing and comprising         an illumination source configured to emit light with a wavelength spectrum such that when impinging on a surface on the banknote printed with said security ink it will result in reflection of light of an identifiable spectrum, wherein said illumination source comprises 8 light sources, 1 of which emits light at about 505 nm, 1 of which emits light at about 660 nm, 1 of which emits light at about 870 nm, 1 of which emits light at about 950 nm, 2 of which emit light at about 775 nm and 2 of which emit light at about 820 nm;

a light detecting utility configured to receive light entering into the housing of the device through said window and detect light of said identifiable spectrum at a plurality of specific wavelengths being of about 775 nm, about 820 nm, about 870 nm, about 660 nm, about 505 nm and about 950 nm;

wherein the reflected light is affected from the absorption features of said security ink and wherein said device is configured to:

(i) detect said reflected light at said plurality of specific wavelengths and calculate therefrom the corresponding absorption at said plurality of specific wavelengths;

(ii) calculate the relative absorptions between said plurality of specific wavelengths; and         (iii) compare said relative absorptions to predetermined reference values of one or more printed elements of an authentic US Dollar banknote; and         a signaling utility that is activated when said relative absorptions correlate with that of said predetermined reference values, the activation of the signaling utility being indicative of an authentic US Dollar banknote.

2. The device of claim 1, adapted for validation of authenticity of a US Dollar banknote of more than one denomination.

3. The device of claim 1, adapted for the validation of authenticity of a US Dollar banknote selected from the group consisting of 10 US Dollar banknote, 20 US Dollar banknote, 50 US Dollar banknote and 100 US Dollar banknote.

4. The device of claim 1, wherein light sources are activated in a defined on/off sequence.

5. The device of claim 1, wherein said light sources are operated in a sequential or concerted manner.

6. The device of claim 1, wherein said light source is an LED.

7. The device of claim 1, wherein said signaling utility is capable of outputting a visual indicator, an audio indicator or a combination thereof.

8. The device of claim 1, wherein the electronic assembly switches off automatically following a defined time period after activation or after a defined time period of inactivity.

9. The device of claim 1, wherein the device is a portable device.

10. The device of claim 1, wherein the printed element is selected from the black United States Federal Reserve System seal, the green United States Department of the Treasury seal or both.

11. A method for using the device of claim 1 for validating the authenticity of a US Dollar banknote comprising one or more printed elements printed with at least one security ink, the security ink having defined light reflecting properties, the method comprises:
   providing said device;
   activating said device;
   placing the window of said device over said one or more printed elements;
   monitoring a signal outputted by said signaling utility and determining based thereon if the banknote is authentic.

12. The method of claim 11, for validating the authenticity of:
   a US Dollar banknote selected from the group consisting of 10 US Dollar banknote, 20 US Dollar banknote, 50 US Dollar banknote and 100 US Dollar banknote.

13. A kit comprising said device of claim 1 and instructions for use.

* * * * *